United States Patent [19]
Markl et al.

[11] Patent Number: 5,394,987
[45] Date of Patent: Mar. 7, 1995

[54] CASSETTE FOR STACKS OF SHEETS OF X-RAY FILM

[75] Inventors: Maximilian Markl, Bernau/Ch.; Johann Zanner, Unterhaching, both of Germany

[73] Assignee: AGFA-Gevaert Aktiengesellschaft, Leverkusen, Germany

[21] Appl. No.: 954,496

[22] Filed: Sep. 30, 1992

[30] Foreign Application Priority Data

Nov. 6, 1991 [DE] Germany ............... 91 13 810.8

[51] Int. Cl.6 ............................................. B65D 85/48
[52] U.S. Cl. ................ 206/455; 206/459.5; 378/185; 40/159.2
[58] Field of Search ............... 206/455, 459.5, 449, 206/456; 378/185, 186, 187; 40/159.2; 116/200, 202; 36/137

[56] References Cited

U.S. PATENT DOCUMENTS

| | | | |
|---|---|---|---|
| 1,680,299 | 8/1928 | Maybee | 40/159.2 |
| 2,473,877 | 6/1949 | Goldstein | 116/200 |
| 2,495,142 | 1/1950 | Seary | 40/159.2 |
| 3,235,991 | 2/1966 | Harper | 40/159.2 |
| 3,511,990 | 5/1970 | Hauss | 378/187 |
| 4,112,165 | 9/1978 | Russell | 40/159.2 X |
| 4,233,760 | 11/1980 | Haynes | 36/137 |
| 4,350,248 | 9/1982 | Bauer | 206/455 |
| 4,496,273 | 1/1985 | Thate | 414/411 |
| 4,712,319 | 12/1987 | Goria | 36/137 |
| 4,895,257 | 1/1990 | Winslow | 206/459.5 X |
| 5,083,665 | 1/1992 | Schoenberg et al. | 206/455 |

FOREIGN PATENT DOCUMENTS

| | | | |
|---|---|---|---|
| 0685004 | 4/1964 | Canada | 40/159.2 |
| 1112887 | 8/1960 | Germany | 378/187 |
| 0667325 | 2/1952 | United Kingdom | 378/187 |

Primary Examiner—Paul T. Sewell
Assistant Examiner—Ted Kavanaugh
Attorney, Agent, or Firm—Darby & Darby

[57] ABSTRACT

A cassette for a stack of superimposed sheets of X-ray film has a bottom wall, four sidewalls disposed at the upper side of and defining with the bottom wall a rectangular or square chamber for at least one stack of sheets, and a cover which is pivotally connected to one of the sidewalls and is movable between an open position to afford access to the chamber and a closed position in which it cooperates with the sidewalls to prevent penetration of light into the chamber. The top surface of at least one sidewall is provided with one or more markers (e.g., in the form of a row of triangular indicia) made of or containing a material which permits ready visual detection of the marker in a darkroom whereby a person looking at the marker can ascertain at a glance whether or not one or more uppermost sheets of a stack in the chamber are misaligned so that they overlie the top surface or surfaces of one or more sidewalls and must be reoriented prior to pivoting of the cover to closed position. Such pivoting of the cover to closed position could result in damage to the misaligned sheet or sheets.

11 Claims, 2 Drawing Sheets

CASSETTE FOR STACKS OF SHEETS OF X-RAY FILM

BACKGROUND OF THE INVENTION

The invention relates to improvements in containers or cassettes (hereinafter called cassettes) for photosensitive materials. More particularly, the invention relates to improvements in cassettes for temporary storage of stacks of superimposed sheets of photosensitive material, such as X-ray film.

Cassettes of the type to which the present invention pertains can be utilized with advantage to supply sheets into, or to receive sheets from, apparatus or machines for the processing of photosensitive material. Reference may be had, for example, to German Pat. No. 31 22 582.

As a rule, a cassette for X-ray film must be introduced into a darkroom in order to receive a stack of superimposed films. The stack should not be higher than the depth of a chamber which is defined by a bottom wall and upstanding sidewalls of the cassette. If the stack in the cassette is too high, the uppermost sheet or sheets are likely to become misaligned in that they overlie the top surface or surfaces of one or more sidewalls. This can result in defacing of and/or other damage to the misaligned sheet or sheets when the cover of the cassette is moved to closed or sealing position in which the cover prevents penetration of light into the chamber for the stack of sheets of photosensitive material to thus permit removal of the loaded cassette from the darkroom.

A person who is in charge of manipulating cassettes and sheets of X-ray film in a darkroom, e.g., of inserting sheets into the chamber of a cassette, often encounters problems in attempting to properly insert the sheets in spite of illumination of the darkroom with customary red light (safelight). In other words, such person may or may not invariably detect the misalignment of one or more sheets at the top of a stack which fills or nearly fills the chamber of a cassette in the darkroom. Thus, the danger of defacing and/or otherwise damaging one or more sheets of a stack of such sheets in a freshly loaded cassette as a result of movement of the cover to its sealing position is always present.

OBJECTS OF THE INVENTION

An object of the invention is to provide a cassette for one or more stacks of superimposed sheets of photosensitive material which is constructed and designed in such a way that a person in charge of inserting sheets into the cassette in a darkroom can readily ascertain the presence or absence of one or more misaligned sheets.

Another object of the invention is to provide the cassette with novel and improved means for facilitating the task of an operator in properly stacking lightsensitive sheets in the chamber of the cassette while the latter is confined in a darkroom.

A further object of the invention is to provide one or more novel and improved sidewalls for use in the above outlined cassette.

An additional object of the invention is to provide novel and improved means for application to an existing cassette in order to facilitate loading of such existing cassette with accurately aligned superimposed sheets of photosensitive material.

Still another object of the invention is to provide a novel and improved method of facilitating the task of manipulating cassettes and sheets of photosensitive material in a darkroom.

SUMMARY OF THE INVENTION

The invention resides in the provision of a cassette for stacks of superimposed and normally accurately aligned sheets (e.g., X-ray films) of photosensitive material. The improved cassette comprises a bottom wall having a first side and a second side, and four sidewalls which are disposed at one side of and define with the bottom wall a square or rectangular chamber for confinement of at least one stack of superimposed sheets. Each sidewall has an internal surface which confronts the chamber and a top surface which faces away from the bottom wall, and the cassette further comprises at least one marker on at least one of the top surfaces and a cover which is movable relative to the sidewalls between a first position in which the chamber is accessible for insertion or evacuation of sheets and a second position in which the cover cooperates with the sidewalls to prevent entry of light into the chamber.

The at least one marker is or can be positioned on the respective top surface to be at least partially overlapped by a misaligned sheet (e.g., by the uppermost sheet of a stack which at least substantially fills the chamber) to thus facilitate visual detection of the misaligned sheet in a darkroom. The at least one marker preferably contains at least one substance which is readily detectable by a human eye in a darkroom. Such substance can be selected to avoid causing changes of density of photosensitive material.

The at least one marker can comprise an array of polygonal (e.g., substantially triangular) indicia. For example, the array can comprise a row of neighboring indicia. If the indicia have a triangular shape, their hypotenuses can be aligned and their apices can be adjacent an elongated edge between the at least one top surface and the respective internal surface. The hypotenuses of such indicia can be parallel or nearly parallel to the edge.

The cover can be pivotally connected to one of the sidewalls by a hinge.

The one side of the bottom wall and the surfaces of the sidewalls are or can be opaque, e.g., black.

The novel features which are considered as characteristic of the invention are set forth in particular in the appended claims. The improved cassette itself, however, both as to its construction and the mode of using the same, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
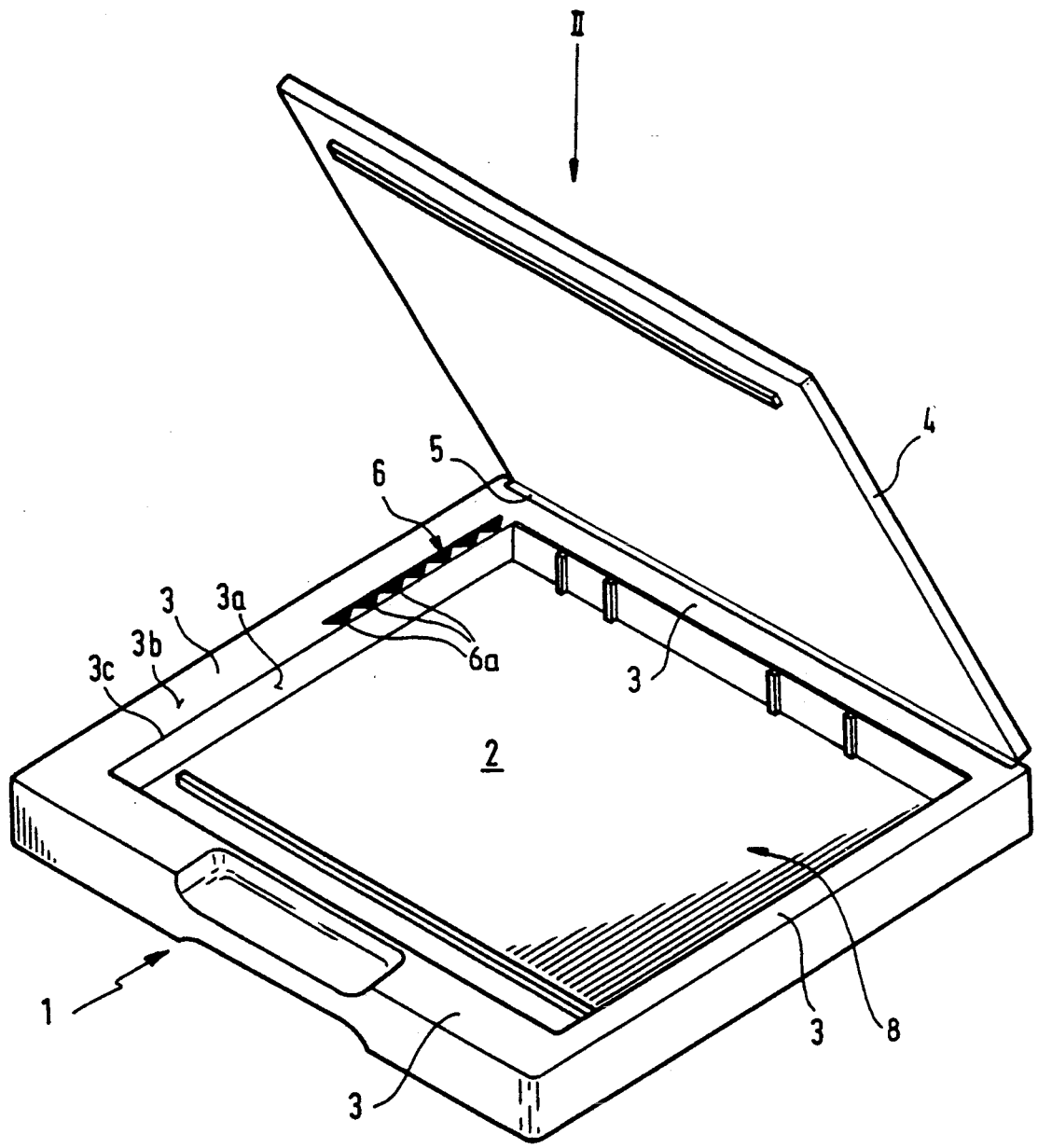
FIG. 1 is a perspective view of a cassette which embodies one form of the invention, the cover being shown in a position in which it affords access to the chamber for one or more stacks of sheets of photosensitive material.

The cassette 1 of FIG. 1 comprises a bottom wall 2, four sidewalls 3 at the upper side of the bottom wall, and a cover 4 which is pivotally connected to one of the sidewalls 3 by a hinge 5. The sidewalls 3 define with the bottom wall 2 a rectangular or square chamber 8 which can receive a stack of properly aligned superimposed sheets 7, e.g., X-ray films (see FIGS. 2 and 3). The cover 4 is pivotable between the illustrated first position in which it affords access to the chamber 8, and a second or closed position (not shown) in which the cover cooperates with the sidewalls 3 to prevent penetration of light into the chamber 8.

Each sidewall 3 has an internal surface 3a which confronts the chamber 8 and a top surface 3b which faces away from the bottom wall 2. The chamber 8 can receive at least one stack of properly aligned superimposed sheets 7, and the height of such stack should not exceed the height of an internal surface 3a, i.e., the distance from the upper side of the bottom wall 2 to the plane of the upper sides 3b of the sidewalls 3. Such selection of the height of a stack in the chamber 8 is preferred in order to permit convenient closing of the cover 4 as well as to reduce the likelihood of misalignment of one or more uppermost sheets 7 of a stack in the chamber 8. However, even if the height of a stack does not exceed the height of an internal surface 3a, the uppermost sheet or sheets of such stack are likely to be misaligned so as to overlie one or more top surfaces 3b and to be apt to be clamped and hence defaced and/or otherwise damaged in response to pivoting of the cover 4 to its closed position.

In order to facilitate the task of a person who is in charge of introducing sheets 7 into the chamber 8 while the cassette 1 is located in a darkroom, the top surface or surfaces 3b of one or more sidewalls 3 are provided with one or more markers 6 made of or containing one or more substances which enhance visual detection of the marker or markers in a dark room. This enables the person in charge to detect one or more misaligned sheets 7 and to change the orientation of such sheet or sheets before the cover 4 is pivoted to the closed position.

Figure 3:
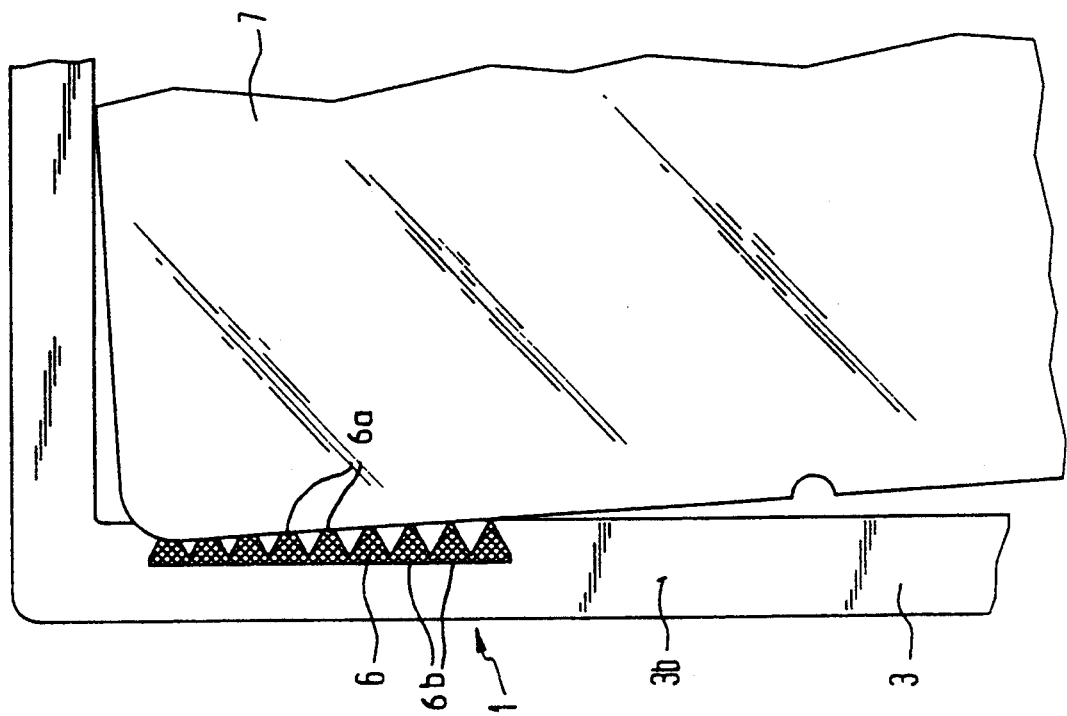
FIG. 3 is a view similar to that of FIG. 2 but showing a misaligned sheet which partially overlaps certain indicia.
Figure 2:
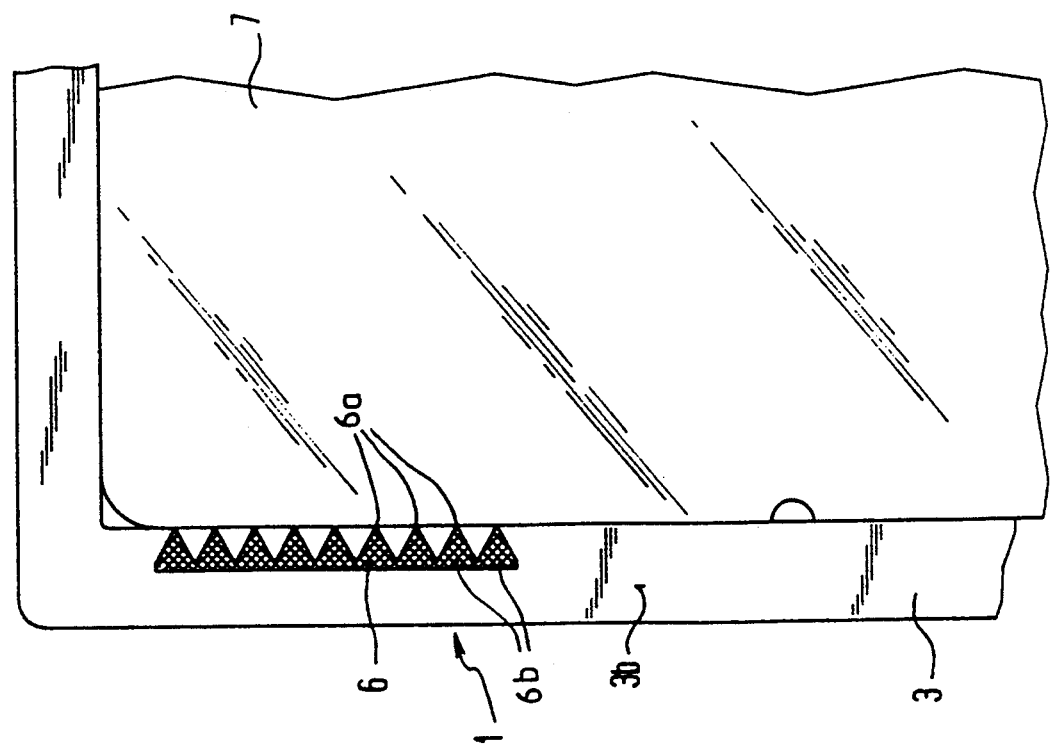
FIG. 2 is an enlarged fragmentary plan view of a portion of the cassette as seen in the direction of arrow II in FIG. 1, with a photosensitive sheet shown in proper position relative to a marker consisting of a row of neighboring triangular indicia.

FIGS. 1, 2 and 3 merely show a single marker 6 which comprises an array of triangular indicia 6a having aligned hypotenuses 6b and apices adjacent or exactly at the edge 3c between the respective top surface 3b and the adjacent internal surface 3a. The line including the hypotenuses of the illustrated triangular indicia 6a is parallel to the respective edge 3c. It is clear that a marker 6 can comprise an array of square, hexagonal, oval, circular or otherwise shaped indicia, that all indicia of a marker need not have the same size and/or shape as well as that the array of indicia need not be a linear array (i.e., a row). All that counts is to provide the top surface 3b of at least one sidewall 3 with a marker 6 or an analogous marker which facilitates the task of the person in charge, namely which enables such person to readily detect one or more misaligned sheets 7 (see FIG. 3 where the illustrated sheet partially overlies some of the indicia 6a) and to change the orientation of the initially misaligned sheet or sheets (note the properly oriented sheet 7 of FIG. 2 which does not overlie any of the indicia 6a). A person seeing the orientation of the sheet 7 of FIG. 2 knows that this sheet, as well as all sheets below it, does not require any reorientation and will not be damaged during or as a result of pivoting of the cover 4 (not shown in FIGS. 2 and 3) to the closed or sealing position.

The marker 6 contains at least one substance which can be readily detected by a human eye in the red light (safelight) within a darkroom. As a rule, the substance or substances will be selected in such a way that they are capable of strongly reflecting safelight in a darkroom (normally a pronouncedly damped red light) in contrast to the characteristics of the adjacent portion of the respective top surface 3b. It is preferred to provide that portion of each top surface 3b which carries one or more markers 6 with a non-reflecting (opaque) material; this further enhances the contrast between the marker 6 and the respective top surface 3b and thereby further simplifies the task of the person in charge of loading the cassette 1 in a darkroom.

As a rule, or at least in many instances, the walls and the cover of a cassette for sheets of X-ray film are black. Since the sheets 7 are also dark, it is rather difficult to detect the exact orientation of the uppermost sheet or sheets 7 in a partially or fully loaded cassette. It has been found that the aforedescribed marker or markers 6 simplify the task of the person in charge and greatly reduce the likelihood of defacing and/or otherwise damaging one or more sheets during, or as a result of, pivoting of the cover 4 to the closed position. The marker or markers 6 enhance the contrast between the color of the sheet or sheets 7 and the color of the indicia 6a and thus facilitate predictable stacking of sheets 7 on top of each other, such stacking being completed when the height of a freshly accumulated stack matches or approximates the height of an internal surface 3a.

Two presently preferred materials which can be used for the making of a marker 6 are known as Fluoresco-Maranyl and Fluoresco-Orange-Siebdruckfarbe (screen printing ink) which are produced and distributed by the Firm Marabu-Werke, Tamm, Federal Republic Germany. The selected material is applied to (e.g., imprinted upon) one side of a strip of polyester foil (known as Flexmark) subsequent to the application to the one side of a substrate of black paint or the like. The other side of the strip is coated with an adhesive and is caused to adhere to the top surface 3b of a selected sidewall 3. It is advisable and important to ensure that the material of the marker is not luminescent, i.e., that it does not radiate light, but is merely capable of strongly or satisfactorily reflecting light which is available in a darkroom.

By way of example, the cassette 1 can be designed to accept and confine sheets of X-ray film having a size of between 18×24 and 35×43 cm. If the sheets are smaller than 35×43 cm but the size of the chamber 8 is to remain unchanged, the cassette 1 can be furnished with one or more partitions (not shown) which are installed between the internal surfaces 3a of the sidewalls 3 to reduce the effective size of the chamber to a value corresponding to the format of sheets to be stacked therein. The end portion(s) of such partition or partitions can be received in grooves (not shown) which are provided therefor in the internal surfaces 3a of the sidewalls 3.

As already mentioned hereinbefore, it is possible to use the chamber 8 for simultaneous storage of two or more stacks of relatively small sheets 7. The chamber 8 is then divided by resorting to suitable partitions, not shown, so that the walls 2 and 3 surround a plurality of smaller chambers each of which can receive a discrete stack of sheets. It is presently preferred to employ the chamber 8 for the storage of a single stack of sheets 7 because many or most presently known automatic sheet withdrawing apparatus are designed to withdraw only successive sheets of a stack of sheets having a predetermined format.

Each sidewall 3 can be provided with one or more markers 6 or analogous markers. Furthermore, one or more markers can be applied to the top surface or surfaces of the aforementioned partition or partitions which can be used if the size of the chamber 8 (without any partitions therein) exceeds the size of sheets to be confined in the cassette. The application of one or more markers to the top surface or surfaces of one or more partitions further simplifies the task of the person in charge of building or supervising the building of stacks of sheets in the chamber 8. FIG. 1 shows relatively small rib-shaped abutments which are provided on the internal surface 3a of one of the sidewalls 3. Such abutments can be used in lieu of or can be said to constitute partitions serving to reduce the effective size of the chamber 8.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A cassette for stacks of superimposed sheets of photosensitive material, comprising a bottom wall having a first side and a second side; a sidewall disposed at one of said sides and at least in part defining with said bottom wall a chamber for confinement of at least one stack of superimposed sheets, said sidewall having an internal surface confronting said chamber and a top surface facing away from said bottom wall; at least one marker provided on said top surface, said at least one marker containing a substance which reflects sufficient radiation from a darkroom safelight to be detectable by a human eye in a darkroom; and a cover movable relative to said sidewall between a first position in which said chamber is accessible and a second position in which said cover cooperates with said sidewall to restrict entry of light into said chamber.

2. The cassette of claim 1, wherein said at least one marker is positioned to be at least partially overlapped by a misaligned sheet of a stack in said chamber to thus facilitate visual detection of such misaligned sheet in a darkroom.

3. The cassette of claim 1, wherein said substance is selected to avoid causing changes of density of photosensitive material.

4. The cassette of claim 1, wherein said at least one marker comprises an array of substantially triangular indicia.

5. The cassette of claim 4, wherein said array comprises a row of neighboring indicia.

6. The cassette of claim 5, wherein said top surface and internal surface define an elongated edge, the indicia of said row having aligned hypotenuses and apices adjacent said edge.

7. The cassette of claim 6, wherein said hypotenuses are at least substantially parallel to said edge.

8. The cassette of claim 1, wherein said one side of said bottom wall and said surfaces of said sidewall are opaque.

9. The cassette of claim 1, further comprising an additional sidewall, and means for pivotally connecting said cover to one of said sidewalls.

10. The cassette of claim 1, wherein said at least one marker is substantially flush with said top surface.

11. The cassette of claim 1, wherein said substance is bright.

* * * * *